US00RE49360E

(19) United States
(12) Reissued Patent
Ayala

(10) Patent Number: US RE49,360 E
(45) **Date of Reissued Patent: *Jan. 10, 2023**

(54) PACKAGING CORNER PROTECTION SYSTEM

(71) Applicant: Antonio Julio Ayala, Greenfield, CA (US)

(72) Inventor: Antonio Julio Ayala, Greenfield, CA (US)

( * ) Notice: This patent is subject to a terminal disclaimer.

(21) Appl. No.: 17/080,454

(22) Filed: Oct. 26, 2020

Related U.S. Patent Documents

Reissue of:
(64) Patent No.: 10,723,534
Issued: Jul. 28, 2020
Appl. No.: 16/209,167
Filed: Dec. 4, 2018

U.S. Applications:
(63) Continuation of application No. 15/266,637, filed on Sep. 15, 2016, now Pat. No. 10,221,003.

(51) Int. Cl.
*B65D 81/05* (2006.01)

(52) U.S. Cl.
CPC ..... *B65D 81/054* (2013.01)

(58) Field of Classification Search
CPC .... B65D 81/054; B65D 81/053; B65D 81/02; B65D 81/05; B65D 85/30
See application file for complete search history.

(56) References Cited

U.S. PATENT DOCUMENTS 1,865,485 A * 7/1932 Sas ..... A47G 1/101 206/453
1,997,853 A * 4/1935 Buhrke ..... A63B 60/54 473/312
2,095,563 A * 10/1937 Cowdery ..... B21C 37/16 72/283
2,196,742 A * 4/1940 Cowdery ..... A01K 87/00 43/18.1 R
D192,385 S * 3/1962 Anderson ..... D8/403
3,047,142 A * 7/1962 Heffley ..... A47B 95/043 206/453
3,049,260 A * 8/1962 Stone ..... B65D 81/054 217/53

(Continued)

FOREIGN PATENT DOCUMENTS

DE 202010004766 * 8/2010 ..... B65D 81/054

*Primary Examiner* — Patricia L Engle
(74) *Attorney, Agent, or Firm* — Jeffrey G. Sheldon; Cislo & Thomas LLP

(57) ABSTRACT

A packaging corner protecting device for objects having edges, the device having an arcuate center and a first and a second arm. The center portion has a longitudinal axis, a length, a first thickness and is formed as about 270° of a cylinder. Each arm is integrally joined to the center portion substantially the length of the center portion, the arms each having a proximate end and an opposed distal end. The arms each having a cross section tapering from a first thickness at its proximate end to a second thickness at the distal end. The arms each having an inner surface and an outer surface, the inner surfaces of each arm lie in planes orthogonal to one another that intersect the longitudinal axis of the center portion. The arms both extend the same distance from the center portion. The device is made from a plastic material comprising high-density polyethylene.

15 Claims, 3 Drawing Sheets

AMENDED

(56) References Cited

U.S. PATENT DOCUMENTS 3,072,313 A * 1/1963 Svendsen ..... B65D 81/054 206/320
3,152,693 A * 10/1964 Anderson ..... B65D 71/04 217/69
3,533,156 A * 10/1970 Melill ..... B23K 20/021 228/262.71
D225,829 S * 1/1973 Szabo ..... D8/403
4,063,702 A * 12/1977 Wilde ..... A47B 95/043 248/345.1
4,120,441 A * 10/1978 Hurley ..... B65D 5/5088 206/453
4,202,449 A * 5/1980 Bendt ..... B65D 81/054 206/453
4,742,916 A * 5/1988 Galea ..... B65D 81/054 206/586
D301,953 S * 7/1989 Evenson ..... D8/349
4,877,673 A * 10/1989 Eckel ..... B65D 81/054 428/172
4,938,357 A * 7/1990 Schmidt ..... B60P 7/0869 206/453
5,518,348 A * 5/1996 Tucker ..... B60P 7/0869 410/99
5,749,512 A * 5/1998 Gingras-Taylor ..... B65D 5/445 229/199
5,918,800 A * 7/1999 Goshorn ..... B60P 7/0869 206/453
8,201,796 B2 * 6/2012 Belyea ..... A47B 95/043 206/453
8,844,719 B2 * 9/2014 Yoshida ..... B65D 57/004 206/453
2004/0076796 A1 * 4/2004 Stubing ..... B65D 81/054 428/119
2004/0138000 A1 * 7/2004 Braly ..... A63B 60/00 473/316
2006/0108249 A1 * 5/2006 Riddleburgh ..... B65D 81/053 206/413
2006/0243636 A1 * 11/2006 Robichaud ..... B65D 81/056 206/586
2009/0301007 A1 * 12/2009 Braid ..... E06B 3/5409 52/204.591
2014/0367306 A1 * 12/2014 Normandin ..... B65D 81/054 206/586
2015/0238324 A1 * 8/2015 Nebosky ..... A61F 2/3094 623/17.16

* cited by examiner

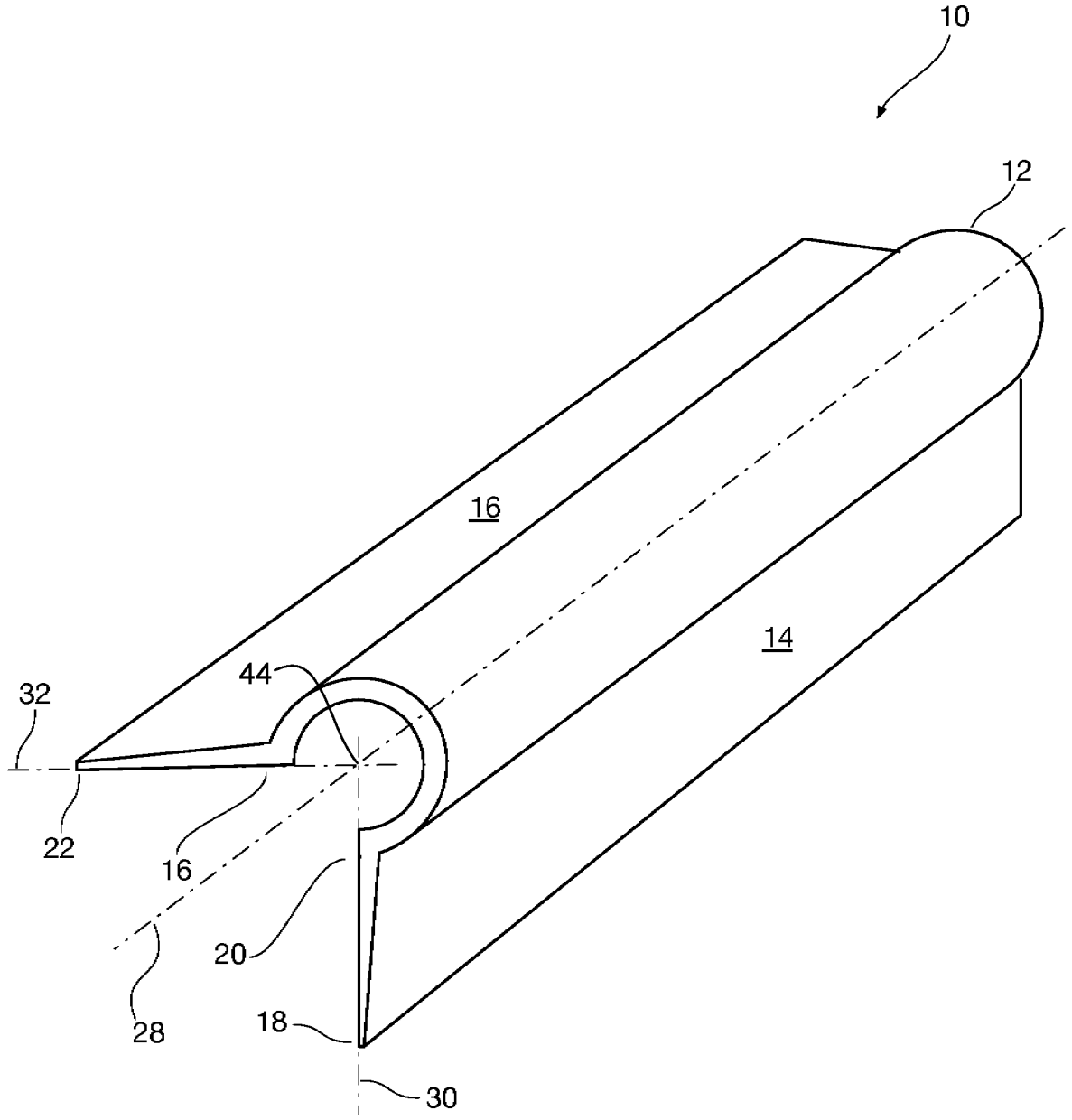
AMENDED FIG. 3

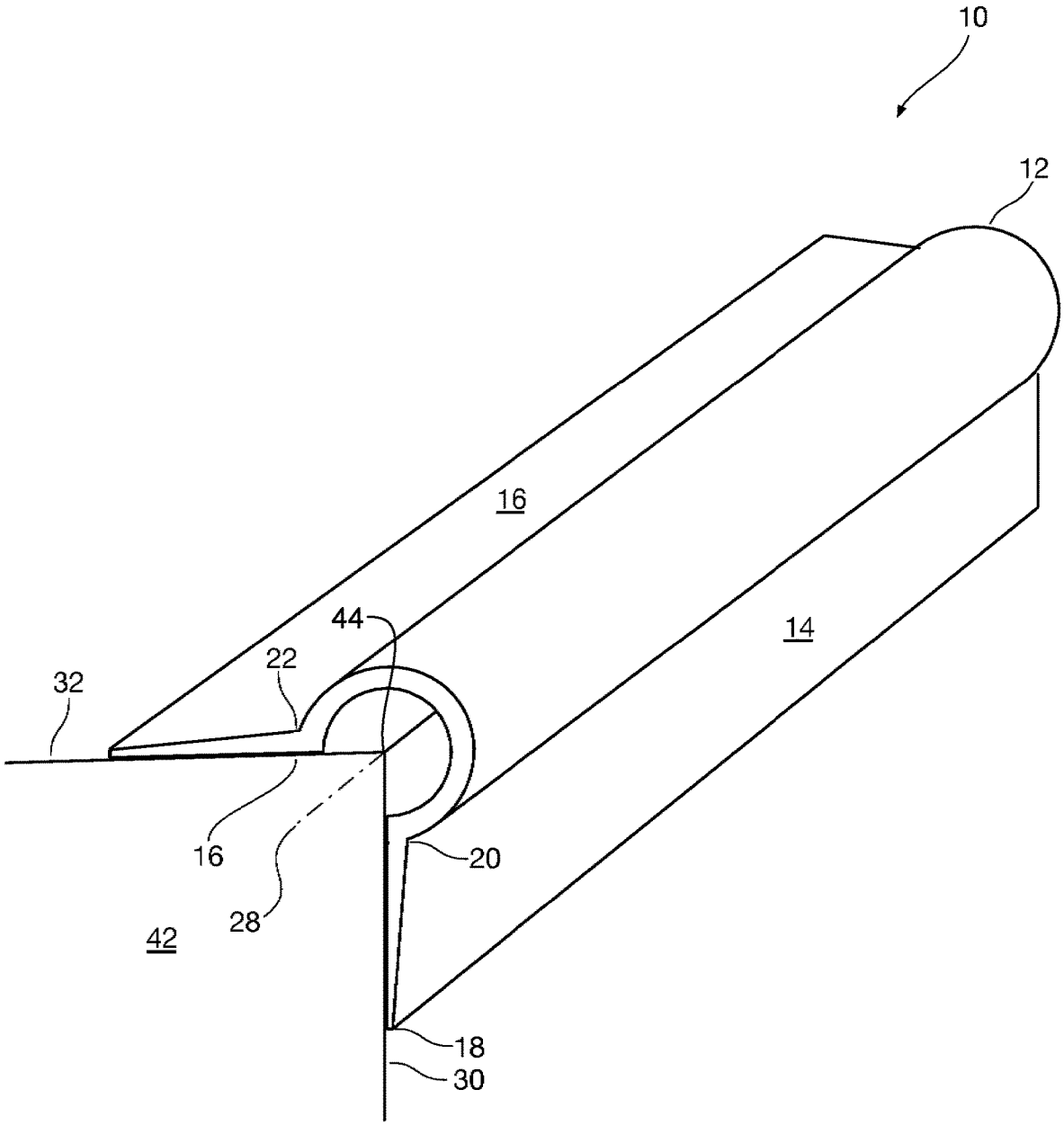
AMENDED FIG. 4

PACKAGING CORNER PROTECTION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. Non-Provisional patent application Ser. No. 15/266,637, titled "Packaging Corner Protection System" filed Sep. 15, 2016 the contents of which are incorporated herein by reference in their entirety.

TECHNICAL FIELD

The present invention relates to cargo transportation. More particularly, the present invention relates to a packaging corner protection system.

BACKGROUND

It is necessary to transport objects having edges with angular, generally right angular cross section, such as containers like boxes and stacks of boxes, cartons or crates, other rectangular objects including but not limited to concrete blocks, bricks, stacks of materials such as gypsum board, plywood, sheet metal, cardboard, paper and other sheet material. These objects are often placed on pallets for transportation.

These objects must be secured during transport, usually by tie-downs such as ropes, cargo straps, or other lashings. Some of these containers or materials have a limited mechanical strength, particularly at their top edges where the ropes cargo straps or other lashings come into contact with and exert large forces on the top edges of these objects. In many cases, deformation of the top edges of these objects will damage the objects or the containers. In addition, where the cargo load consists of numerous small objects such as bricks, blocks, or smaller boxes, it is often necessary to stabilize the load across portions of the top edges of the load to prevent movement of ones of the objects that are not in contact with the tie-downs.

SUMMARY

A packaging corner protecting device for objects having edges with a generally right angular cross section includes an arcuate center portion having a longitudinal axis, a length and a first thickness and formed as about 270° of a cylinder. A first arm and a second arm extend from the center portion and are integrally joined to the center portion substantially the length of the center portion. The first arm and the second arm each have a proximate end at the center portion and an opposed distal end. The first arm and the second arm each have a cross section tapering from a first thickness at its proximate end to a second thickness at the distal end. The first thickness being greater than the second thickness, and the first and second arms each having an inner surface and an outer surface. The inner surfaces of each arm lie in planes orthogonal to one another that interest the longitudinal axis of the arcuate center portion. The first arm and the second arm both extend the same distance from the center portion and the device is made from a plastic material comprising high-density polyethylene.

Optionally, the first arm includes a plurality of longitudinal ridges on both the inner surfaces and outer surfaces thereof.

Optionally, the second arm includes a plurality of longitudinal ridges on both the inner surface and outer surfaces thereof.

Optionally, the first arm and the second arm each include a plurality of longitudinal ridges on the inner surfaces thereof.

Optionally, the first arm and the second arm each include a plurality of longitudinal ridges on the outer surfaces thereof.

Optionally, the first arm and the second arm each taper in thickness in a plurality of steps.

During use, the cylindrical shape of the center portion of the protecting device is spaced apart from the top-to-side edge of the object. This ensures that that the load exerted by the tie-downs on the device will be carried by the top and side portions of the object in the regions contacted by the inner surfaces of the first and second arms. Further due to the increased number of bends in the profile the device will have a greater stiffness in its longitudinal direction, which will improve the distribution of the load.

The protecting device of the present invention may be formed in arbitrary lengths by an extrusion process and may be cut to desired shorter lengths at the time of use.

BRIEF DESCRIPTION OF THE DRAWING FIGURES

The invention will be explained in more detail in the following with reference to embodiments and to the drawing in which are shown:

FIG. 3 is an isometric view of an exemplary protection device in accordance with another aspect of the present invention; and FIG. 4 is an isometric view of an exemplary protection device in accordance with the present invention showing a corner of an object being secured by the protection device.

DETAILED DESCRIPTION

In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

Figure 1:
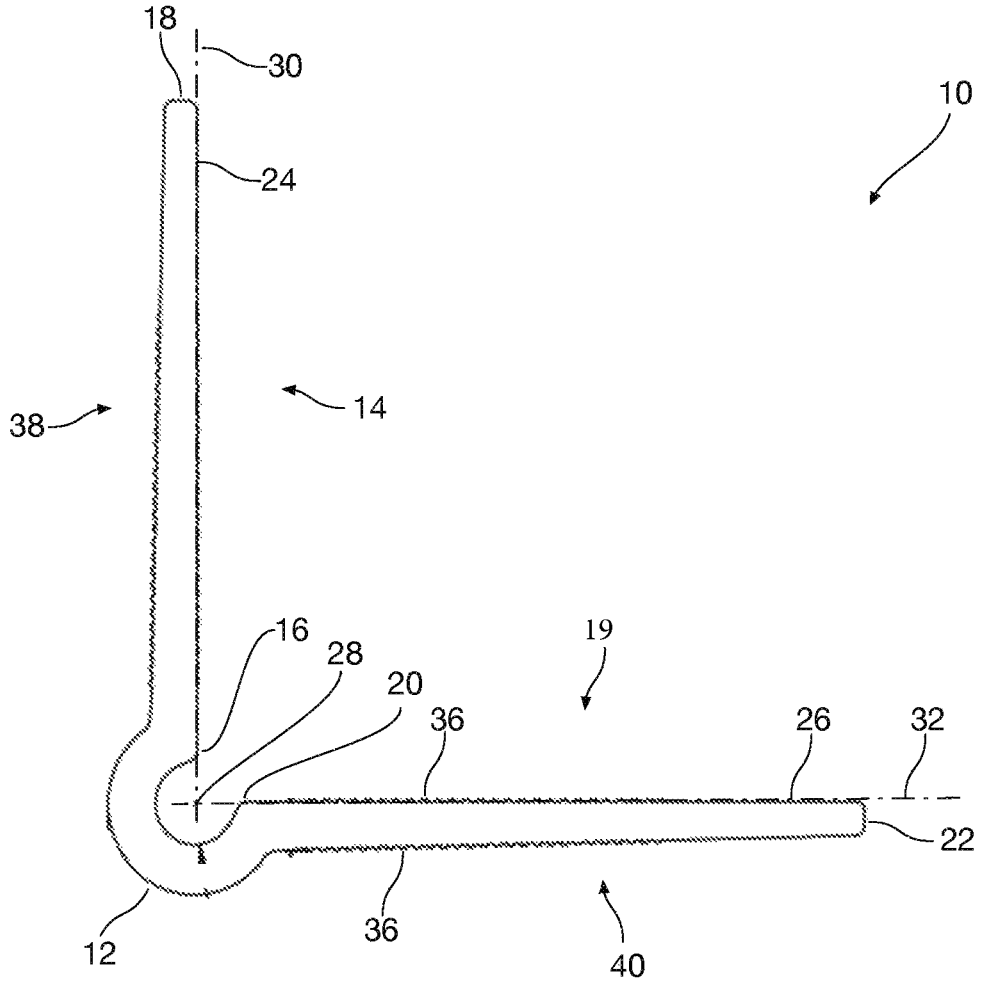
FIG. 1 is a cross sectional view of an exemplary protection device in accordance with the present invention.

Referring first of all to FIG. 1, a cross sectional view shows an exemplary protection device 10 in accordance with the present invention. The protection device 10 may be formed using an extrusion process from materials such as, but not limited to, polyvinyl chloride (PVC), polyethylene, low-density polyethylene (LDPE) high-density polyethylene (HDPE) or ultra-high-density polyethylene (UHDPE).

In some embodiments of the invention, metals such as aluminum or alloys could be employed.

The packaging corner protecting device 10 includes an arcuate center portion 12 having a first thickness and formed as a partial radial section of a cylinder, about 270° more or less. The thickness of the center portion 12 depends somewhat on the application in that embodiments of the invention designed to secure heavier loads should be thicker than embodiments of the invention designed to secure lighter loads. In a typical embodiment, the wall thickness of the cylindrical central portion 12 may be about 0.6875 inch.

A first arm 14 extends from a proximal edge 16 integrally formed at a first edge of the partial cylinder 12 to a distal end 18 and runs substantially the length of the central portion 12. A second arm 19 extends from a proximal edge 20 integrally formed at a first edge of the partial cylinder 12 to a distal end 22 and runs substantially the length of the central portion 12. Inner surfaces 24 and 26, respectively of the first and second arms are substantially planar and each lies in a plane parallel to the axis 28 of the cylindrical axis of the central portion 12 that is coextensive with two radial axes (30, and 32, respectively) of the central portion disposed orthogonally with respect to one another.

Figure 2:
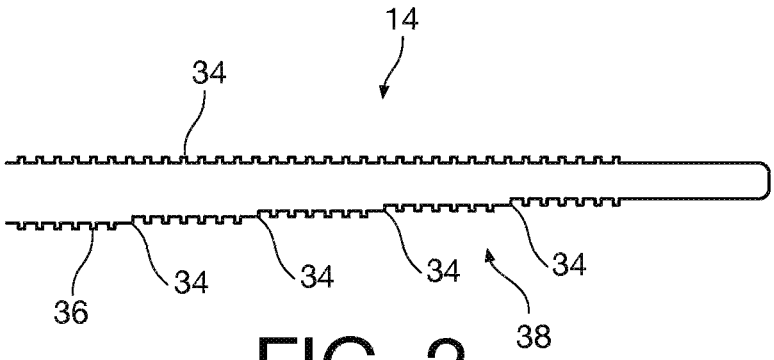
FIG. 2 is a cross sectional view of a portion of one arm of another exemplary protection device in accordance with another aspect of the present invention.

The first arm 14 and the second arm [18] *19* both have cross sections that taper from the first thickness at the proximate end 20 to a second smaller thickness at the distal end 22. In an embodiment where the thickness of the central portion 12 is 0.6875 inch more or less, the distal ends of the first and second arms 14 and [18] *19* may taper to 0.250 inch more or less. FIG. 2 shows an exemplary embodiment where the taper is a linear taper. FIG. 2 shows an exemplary embodiment where the taper is a stepped taper, and includes a plurality of steps 34.

According to one aspect of the present invention, both the first and second arms 14 and [18] *19* may extend out the same distance from the central portion 12. In one embodiment, both arms 14 and [18] *19* extend a distance 6 inches more or less from the central portion 12. According to another aspect of the present invention one arm (to extend over the top surface of the object) could be longer than the other arm (to extend over the side surface of the object). In an exemplary non-limiting embodiment, one arm may extend a distance 6 inches more or less from the central portion 12 and the other arm may extend a distance 4 inches more or less from the central portion 12.

According to another aspect of the present invention, the arms may be provided with longitudinal ridges 34 that run parallel to the axis 28 of the central portion 12. The ridges 36 may be formed on the inner surfaces 24 and 26 of the first and second arms. In other embodiments, the ridges may be formed on both the inner surfaces 24 and 26 and the outer surfaces 38 and 40 of the first and second arms. In one exemplary embodiment of the invention, the ridges have a height of 0.01 inch more or less and a depth of 0.04 inch more or less. The height and spacing of the ridges can be adjusted depending on the nature and surface conditions of particular objects with which the device will be used. For example, devices used to tie down stacks of cardboard boxes. Bricks, cardboard sheets, or metal sheets may use ridges of different dimensions.

Referring now to FIG. 3 and FIG. 4, an isometric view shows an exemplary protection device in accordance with the present invention showing a corner of an object 42 being secured by the protection device 10. Note that the corner 44 of the object 42 is in alignment with the longitudinal axis 28 of the central portion of the protection device 10. This assures that the protection device 10 is spaced apart from the edge separating the top of the object 42 from its side. As shown in FIGS. 3 and 4, outer surfaces 38 and 40, respectively of the first and second arms 14, 16 can be substantially, or entirely, planar.

Although the above provides a full and complete disclosure of the preferred embodiments of the invention, various modifications, alternate constructions and equivalents will occur to those skilled in the art. Therefore, the above should not be construed as limiting the invention, which is defined by the claims.

What is claimed is:

1. A packaging corner protecting device useful for objects having a corner for protecting the object from damage caused by a tie down strap, the device comprising:

(a) an arcuate center portion having a longitudinal axis, a length, a first thickness and formed as about 270° of a cylinder[.]*;*

(b) a first arm extending from the center portion and integrally joined to the center portion substantially the length of the center portion, the first arm having a proximate end at the center portion and an opposed distal end, the first arm having a cross section tapering from a first thickness at its proximate end to a second thickness at the distal end, the first thickness being greater than the second thickness, the first arm having an inner surface and an outer surface; and (c) a second arm extending from the center portion and integrally joined to the center portion substantially the length of the center portion, the second arm having a proximate end at the center portion and an opposed distal end, the second arm having a cross section tapering from a first thickness at a proximate end to a second thickness at the distal end, the first thickness being greater than the second thickness, the second arm having an inner surface and an outer surface;

wherein the inner surfaces of each arm lie in planes orthogonal to one another that intersect the longitudinal axis of the arcuate center portion[;], wherein the entire outer surface of each arm is planar, wherein the first arm and the second arm both extend the same distance from the center portion, and the device is made from a plastic material comprising high-density polyethylene.

2. The packaging corner protection device of claim 1, wherein the first arm includes a plurality of longitudinal ridges on [both] the inner [surfaces and outer surfaces thereof] *surface*.

3. The packaging corner protection device of claim 1, wherein the second arm includes a plurality of longitudinal ridges on [both] the inner surface [and outer surfaces thereof].

4. The packaging corner protection device of claim 1, wherein the first arm and the second arm each include a plurality of longitudinal ridges on the inner surfaces thereof.

[5. The packaging corner protection device of claim 1, wherein the first arm and the second arm each include a plurality of longitudinal ridges on the outer surfaces thereof.]

[6. The packaging corner protecting device of claim 1 wherein the first arm and the second arm each taper in thickness in a plurality of steps.]

7. The packaging corner protection device of claim 1, wherein the first thickness of the center portion is about 0.6875 inch.

8. The packaging corner protection device of claim 1, wherein the distal ends of the first and second arms taper to a thickness of about 0.250 inch.

9. A combination comprising:

an object having a corner;

a packaging corner protecting device on the corner of the object, the device comprising:

(a) an arcuate center portion having a longitudinal axis, a length, a first thickness and formed as about 270° of a cylinder[.];

(b) a first arm extending from the center portion and integrally joined to the center portion substantially the length of the center portion, the first arm having a proximate end at the center portion and an opposed distal end, the first arm having a cross section tapering from a first thickness at its proximate end to a second thickness at the distal end, the first thickness being greater than the second thickness[;], the first arm having an inner surface and an outer surface, the inner surface of the first arm lying substantially flat against the side surface of the object; and (c) a second arm extending from the center portion and integrally joined to the center portion substantially the length of the center portion, the second arm having a proximate end at the center portion and an opposed distal end, the second arm having a cross section tapering from a first thickness at a proximate end to a second thickness at the distal end, the first thickness being greater than the second thickness, the second arm having an inner surface and an outer surface, the inner surface of the second arm lying substantially flat against the side surface of the object; and wherein the inner surfaces of each arm lie in planes orthogonal to one another that intersect the longitudinal axis of the arcuate center portion, wherein the entire outer surface of each arm is planar, wherein the first arm and the second arm both extend the same distance from the center portion, and the device is made from a plastic material comprising high-density polyethylene.

10. The combination of claim 9, wherein the first arm of the packaging corner protection device includes a plurality of longitudinal ridges on [both] the inner [surfaces and outer surfaces thereof] *surface*.

11. The combination of claim 9, wherein the second arm of the packaging corner protection device includes a plurality of longitudinal ridges on [both] the inner surface [and outer surfaces thereof].

12. The combination of claim 9, wherein the first arm and the second arm of the packaging corner protection device each include a plurality of longitudinal ridges on the inner surfaces thereof.

[13. The combination of claim 9, wherein the first arm and the second arm of the packaging corner protection device each include a plurality of longitudinal ridges on the outer surfaces thereof.]

[14. The combination of claim 9, wherein the first arm and the second arm of the packaging corner protecting device each taper in thickness in a plurality of steps.]

15. The combination of claim 9, [herein] *wherein* the first thickness of the center portion *of the device* is about 0.6875 inch.

16. The combination of claim 9, wherein the [distal ends of the first and second arms taper to a thickness of about 0.250 inch] *first thickness of the center portion of the device is about 0.6875 inch*.

17. A packaging corner protecting device useful for objects having a corner for protecting the object from damage caused by a tie down strap, the device comprising:

(a) an arcuate center portion having a longitudinal axis, a length, a first thickness of about 0.6875 inch and formed as about 270° of a cylinder[,];

(b) a first arm extending from the center portion and integrally joined to the center portion substantially the length of the center portion, the first arm having a proximate end at the center portion and an opposed distal end, the first arm having a cross section tapering from a first thickness at its proximate end to a second thickness at the distal end, the first thickness being greater than the second thickness, the second thickness being about 0.250 inch, the first arm having an inner surface and an outer surface; and (c) a second arm extending from the center portion and integrally joined to the center portion substantially the length of the center portion, the second arm having a proximate end at the center portion and an opposed distal end, the second arm having a cross section tapering from a first thickness at a proximate end to a second thickness at the distal end, the first thickness being greater than the second thickness, the second arm having an inner surface and an outer surface;

wherein the inner surfaces of each arm lie in planes orthogonal to one another that intersect the longitudinal axis of the arcuate center portion, wherein the entire outer surface of each arm is planar, wherein the first arm and the second arm both extend the same distance from the center portion, and the device is made from a plastic material comprising high-density polyethylene.

*18. A packaging corner protecting device useful for objects having a corner for protecting the object from damage caused by a tie down strap, the device comprising:*

*(a) an arcuate center portion having a longitudinal axis, a length, a first thickness and formed as about 270° of a cylinder;*

*(b) a first arm extending from the center portion and integrally joined to the center portion substantially the length of the center portion, the first arm having a proximate end at the center portion and an opposed distal end, the first arm having a cross section tapering from a first thickness at its proximate end to a second thickness at the distal end, the first thickness being greater than the second thickness, the first arm having an inner surface and an outer surface; and*

*(c) a second arm extending from the center portion and integrally joined to the center portion substantially the length of the center portion, the second arm having a proximate end at the center portion and an opposed distal end, the second arm having a cross section tapering from a first thickness at a proximate end to a second thickness at the distal end, the first thickness being greater than the second thickness, the second arm having an inner surface and an outer surface;*

*wherein the inner surfaces of each arm lie in planes orthogonal to one another that intersect the longitudinal axis of the arcuate center portion, wherein the outer surface of each arm has a plurality of longitudinal ridges thereon, wherein the first arm and the second arm both extend the same distance from the center portion, and the device is made from a plastic material comprising high-density polyethylene.*

*19. A combination comprising:*

*an object having a corner;*

*a packaging corner protecting device on the corner of the object, the device comprising:*

(*a*) *an arcuate center portion having a longitudinal axis, a length, a first thickness and formed as about 270° of a cylinder;*

(*b*) *a first arm extending from the center portion and integrally joined to the center portion substantially the length of the center portion, the first arm having a proximate end at the center portion and an opposed distal end, the first arm having a cross section tapering from a first thickness at its proximate end to a second thickness at the distal end, the first thickness being greater than the second thickness, the first arm having an inner surface and an outer surface, the inner surface of the first arm lying substantially flat against the side surface of the object; and*

(*c*) *a second arm extending from the center portion and integrally joined to the center portion substantially the length of the center portion, the second arm having a proximate end at the center portion and an opposed distal end, the second arm having a cross section tapering from a first thickness at a proximate end to a second thickness at the distal end, the first thickness being greater than the second thickness, the second arm having an inner surface and an outer surface, the inner surface of the second arm lying substantially flat against the side surface of the object; and*

*wherein the inner surfaces of each arm lie in planes orthogonal to one another that intersect the longitudinal axis of the arcuate center portion, wherein the outer surface of each arm has a plurality of longitudinal ridges thereon, wherein the first arm and the second arm both extend the same distance from the center portion, and the device is made from a plastic material comprising high-density polyethylene.*

* * * * *